United States Patent
Hong et al.

(10) Patent No.: US 11,670,982 B2
(45) Date of Patent: Jun. 6, 2023

(54) MOTOR APPARATUS HAVING A MOTOR COOLING STRUCTURE

(71) Applicants: HYUNDAI MOTOR COMPANY, Seoul (KR); KIA MOTORS CORPORATION, Seoul (KR)

(72) Inventors: Hyun Seok Hong, Seoul (KR); Woo Suk Jung, Hwaseong-si (KR); Hyun Su Cho, Seoul (KR); Sang Hyun Jung, Hwaseong-si (KR); Hee Kwang Lee, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 60 days.

(21) Appl. No.: 17/188,127

(22) Filed: Mar. 1, 2021

(65) Prior Publication Data

US 2022/0103042 A1   Mar. 31, 2022

(30) Foreign Application Priority Data

Sep. 29, 2020   (KR) ........................ 10-2020-0126923

(51) Int. Cl.
*H02K 5/20* (2006.01)
*H02K 9/06* (2006.01)

(52) U.S. Cl.
CPC ............... *H02K 5/207* (2021.01); *H02K 9/06* (2013.01)

(58) Field of Classification Search
CPC ............ H02K 5/20; H02K 5/207; H02K 9/02; H02K 9/04; H02K 9/06; H02K 1/2786; H02K 1/2787; H02K 1/2789; H02K 1/2791; H02K 1/27915; H02K 1/2792; H02K 9/225; H02K 9/227; H02K 21/22
See application file for complete search history.

(56) References Cited

U.S. PATENT DOCUMENTS

| | | | | |
|---|---|---|---|---|
| 5,191,247 A | * | 3/1993 | Possell | F04D 17/161 415/90 |
| 2015/0162805 A1 | * | 6/2015 | Tsumagari | H02K 1/2766 310/59 |
| 2016/0039529 A1 | * | 2/2016 | Buchmueller | B64D 1/12 244/65 |

(Continued)

FOREIGN PATENT DOCUMENTS

| KR | 10-2011-0111282 A | 10/2011 |
|---|---|---|
| KR | 10-2014-0042591 A | 4/2014 |
| KR | 10-1956021 B1 | 3/2019 |

*Primary Examiner* — Eric Johnson
(74) *Attorney, Agent, or Firm* — Lempia Summerfield Katz LLC (57) ABSTRACT

A motor apparatus has a cooling structure capable of effectively cooling the motor by inducing a fluid flow into the motor. In particular, the motor apparatus includes: a first part having a first flow path and a motor installed thereon; a second part having a second flow path and configured to be rotatably mounted on the first part and connected to the motor; and a turbine portion coupled to the second part and including disks stacked on one another forming spaces therebetween. When the turbine portion is rotated together with the second part, air is drawn through the first flow path or the second flow path and introduced into an opening hole of each of the disks, and the air is discharged into the spaces formed between the respective disks to cool the motor.

8 Claims, 5 Drawing Sheets

(56) References Cited

U.S. PATENT DOCUMENTS

| | | | |
|---|---|---|---|
| 2017/0356459 A1* | 12/2017 | Hino | F04D 29/281 |
| 2017/0356464 A1* | 12/2017 | Hino | F04D 17/161 |
| 2019/0287878 A1 | 9/2019 | Garcia-Polanco et al. | |
| 2020/0018527 A1 | 1/2020 | Heisey et al. | |

* cited by examiner

MOTOR APPARATUS HAVING A MOTOR COOLING STRUCTURE

CROSS REFERENCE TO RELATED APPLICATION

This application claims priority to and the benefit of Korean Patent Application No. 10-2020-0126923, filed on Sep. 29, 2020, the entire contents of which are incorporated herein by reference.

FIELD

The present disclosure relates to a motor apparatus having a cooling structure capable of effectively cooling the motor by inducing a fluid flow into the motor.

BACKGROUND

The statements in this section merely provide background information related to the present disclosure and may not constitute prior art.

A motor is a power element very commonly used in a current science and technology industry. However, regardless of a large motor supplying large power or a small motor supplying small power, high heat may be very easily accumulated in a motor housing after the motor starts and the rotor is operated. The motor does not have a cooling structure that quickly dissipates the high heat generated by the operation of the motor, and the high heat accumulated in the motor may thus attenuate the magnetic force of a magnet, thereby gradually decreasing an operation efficiency of the motor.

In addition, if a temperature of the motor is increased to a predetermined level, which may damage the internal portions of the motor and cause a fire in the motor.

We have discovered that currently and commonly used technology uses a cooling fan installed at one end of a rotating shaft positioned at the center of the motor to suppress the temperature from being rapidly increased during the operation of the motor. However, we have found that this technology may only allow a forward air flow of the cooling fan to pass through an outer surface of the motor housing, and does not actually allow the forward air flow to be directly introduced into the housing. Therefore, this technology fails to quickly and effectively cool the inside of the motor.

The contents described as the related art have been provided only to assist in understanding the background of the present disclosure and should not be considered as corresponding to the related art known to those having ordinary skill in the art.

SUMMARY

The present disclosure provides a motor apparatus having a cooling structure capable of effectively cooling the motor by inducing a fluid flow into the motor, thereby inhibiting overheating of the motor to secure an output performance of the motor, and thus extending a service life of the motor.

According to an exemplary form of the present disclosure, the motor apparatus having a cooling structure includes: a first part having a first flow path and a motor installed thereon; a second part having a second flow path, being rotatably mounted on the first part, and connected to the motor to be rotated when the motor is operated; and a turbine portion coupled to the inside of the second part to be rotated together with the second part, and having a plurality of disks each having an opening hole and stacked on each other in a vertical direction of the motor apparatus to form a spaced space between the respective disks, the opening hole and the spaced space being in communication with each other, wherein when the turbine portion is rotated together with the second part, air may be drawn through the first flow path or the second flow path and introduced into the opening hole of each of the disks, and the air introduced into the opening hole may then be discharged into the spaced space between the respective disks to cool the motor.

The first part may have a motor seating portion extending in the vertical direction and seating the motor thereon, and a turbine seating portion extending from the inside of the motor seating portion in the vertical direction and seating the turbine portion thereon.

The motor may include a stator portion mounted on the motor seating portion, a coil portion positioned along a circumference of the stator portion, and a rotor portion surrounding the coil portion and coupled to the inner surface of the second part.

A plurality of through-holes may be formed in a circumferential surface of the motor seating portion, and air discharged from the turbine portion may pass through the through-holes and be moved to the motor.

The second part may have an installation portion extending in the vertical direction, and each of the disks forming the turbine portion may have a coupling hole into which the installation portion is inserted, each of the disks being coupled to the installation portion through the coupling hole.

A shaft may vertically pass through and be coupled to a central portion of the second part to be rotated together with the second part.

A plurality of first flow paths may be formed on the circumferential surface or lower surface of the first part, and a plurality of second flow paths may be formed on the circumferential surface or upper surface of the second part.

A vertical length of the turbine portion may be longer than a vertical length of the motor as the disks are stacked on each other.

According to another form of the present disclosure, a motor apparatus having a cooling structure for an air mobility includes: a first part having a first flow path and a motor installed thereon; a second part having a second flow path, being rotatably mounted on the first part, connected to the motor to be rotated when the motor is operated, and rotated together with a shaft which is coupled to its central portion to rotate a propeller; and a turbine portion coupled to the inside of the second part to be rotated together with the second part, and having a plurality of disks each having an opening hole and stacked on each other in a vertical direction to form a spaced space between the respective disks, the opening hole and the spaced space being in communication with each other, wherein when the turbine portion is rotated together with the second part, air may be drawn through the first flow path or the second flow path and introduced into the opening hole of each of the disks, and the air introduced into the opening hole may then be discharged into the spaced space between the respective disks to cool the motor.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a motor apparatus having a cooling structure according to exemplary forms of the present disclosure is described with reference to the accompanying drawings.

Figure 1:
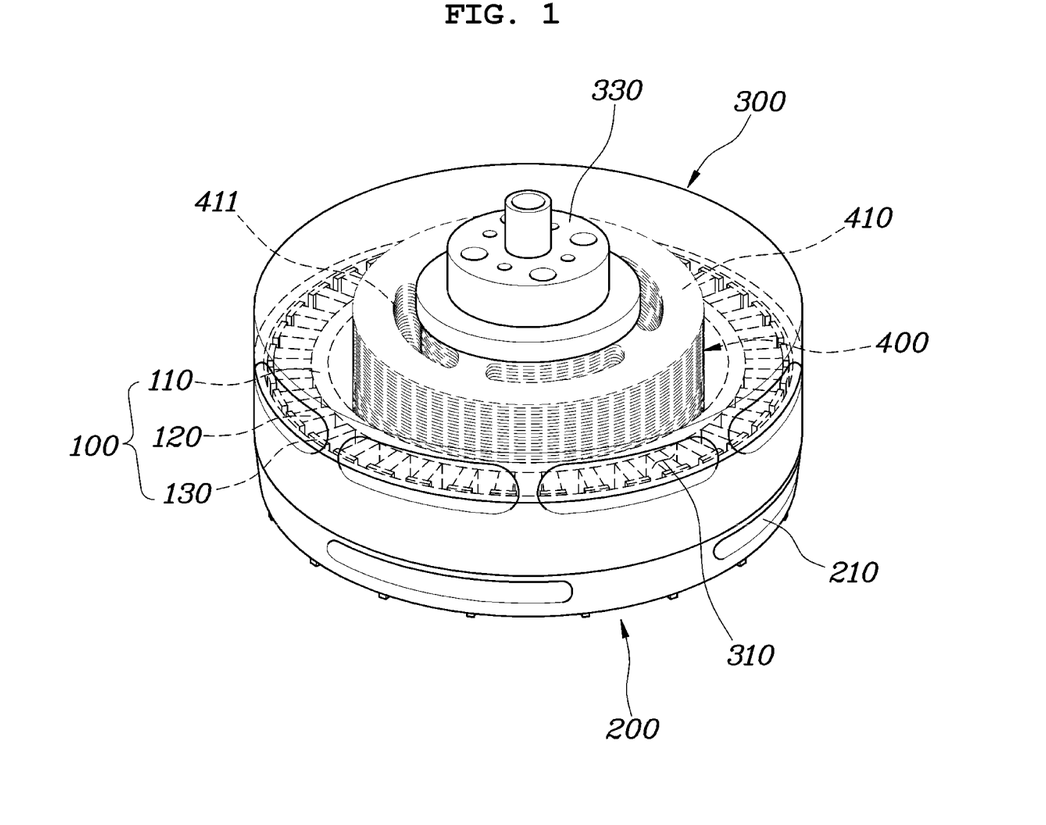
FIG. 1 is a view showing a motor apparatus having a cooling structure according to one form of the present disclosure.
Figure 2:
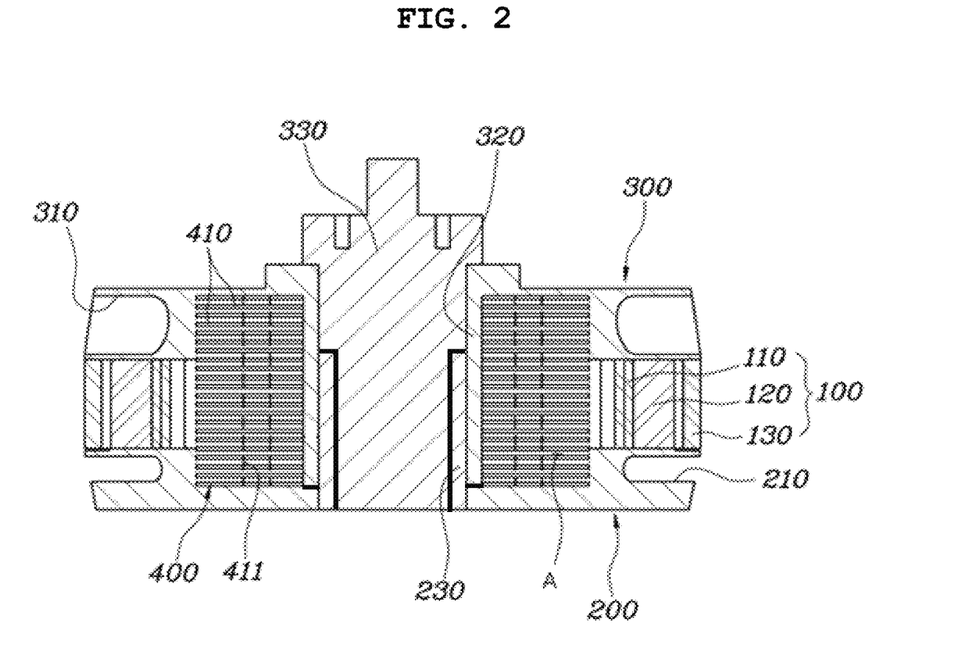
FIG. 2 is a cross-sectional view of the motor apparatus having a cooling structure shown in FIG. 1.
Figure 3:
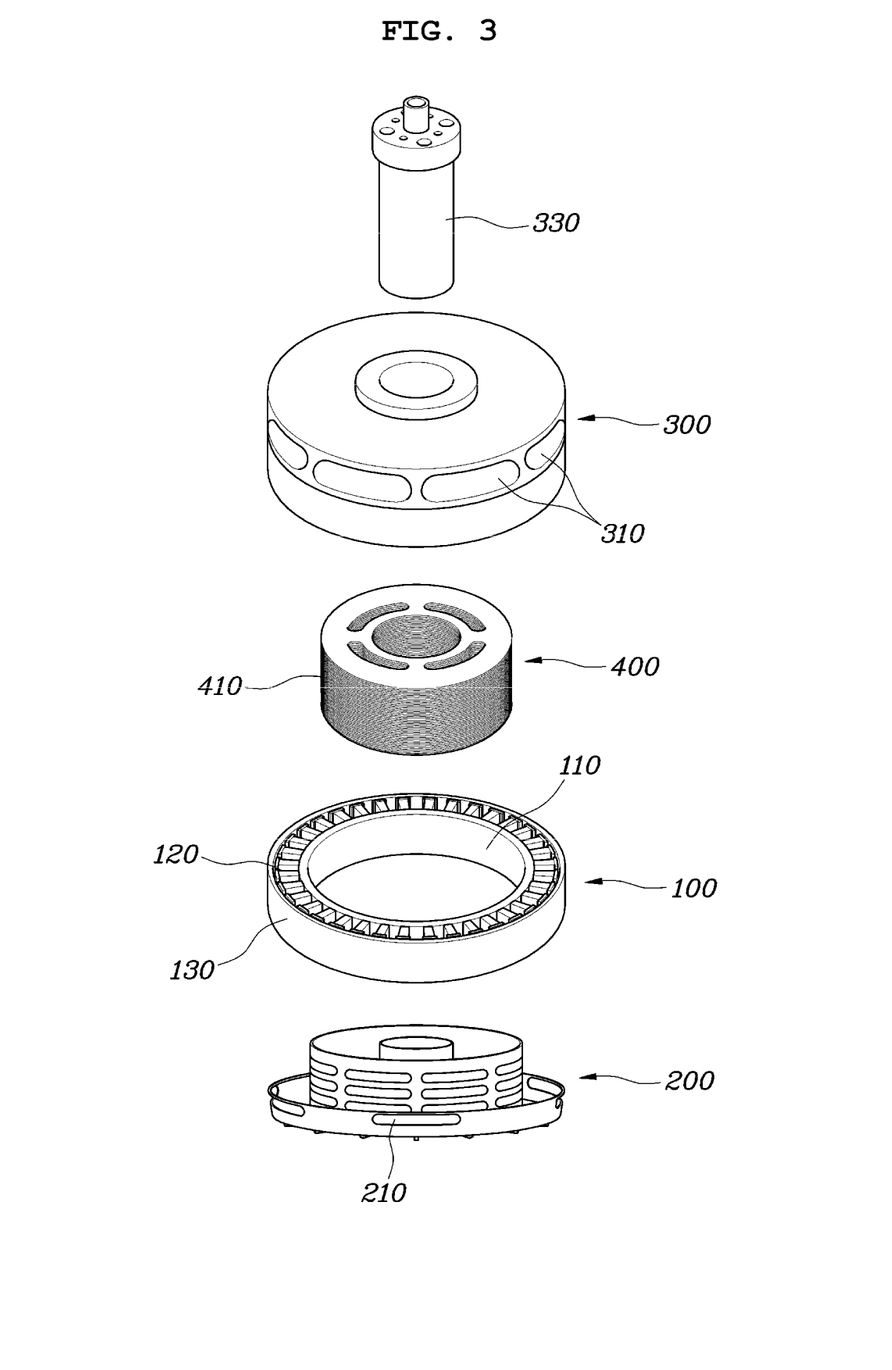
FIG. 3 is an exploded perspective view of the motor apparatus having a cooling structure shown in FIG. 1.
Figure 4:
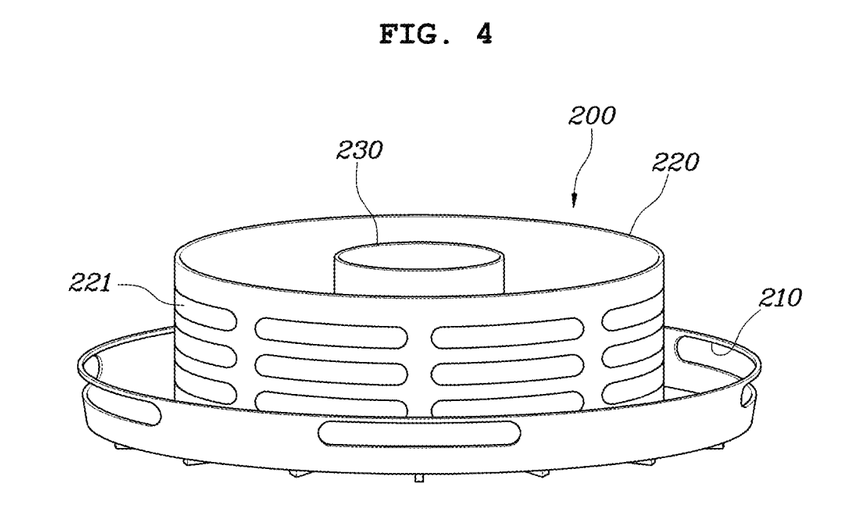
FIG. 4 is a view showing a first part of the motor apparatus having a cooling structure shown in FIG. 1.
Figure 5:
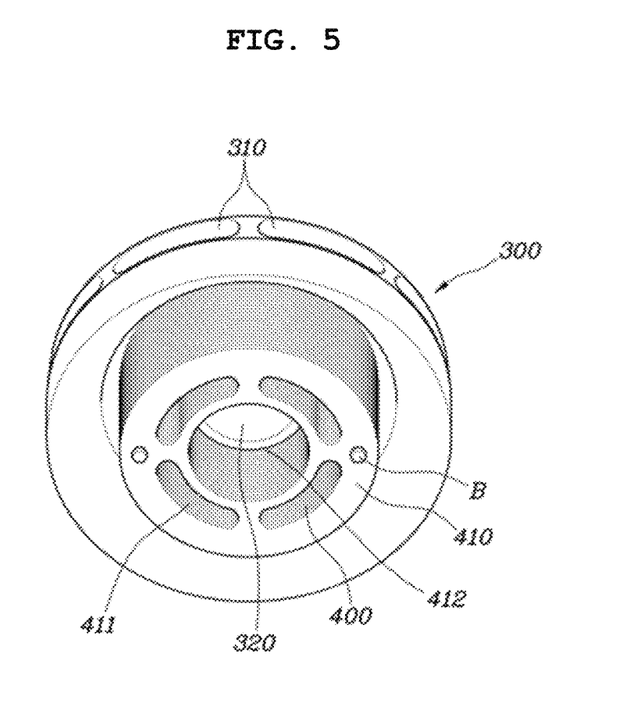
FIG. 5 is a view showing a second part and turbine portion of the motor apparatus having a cooling structure shown in FIG. 1.
Figure 6:
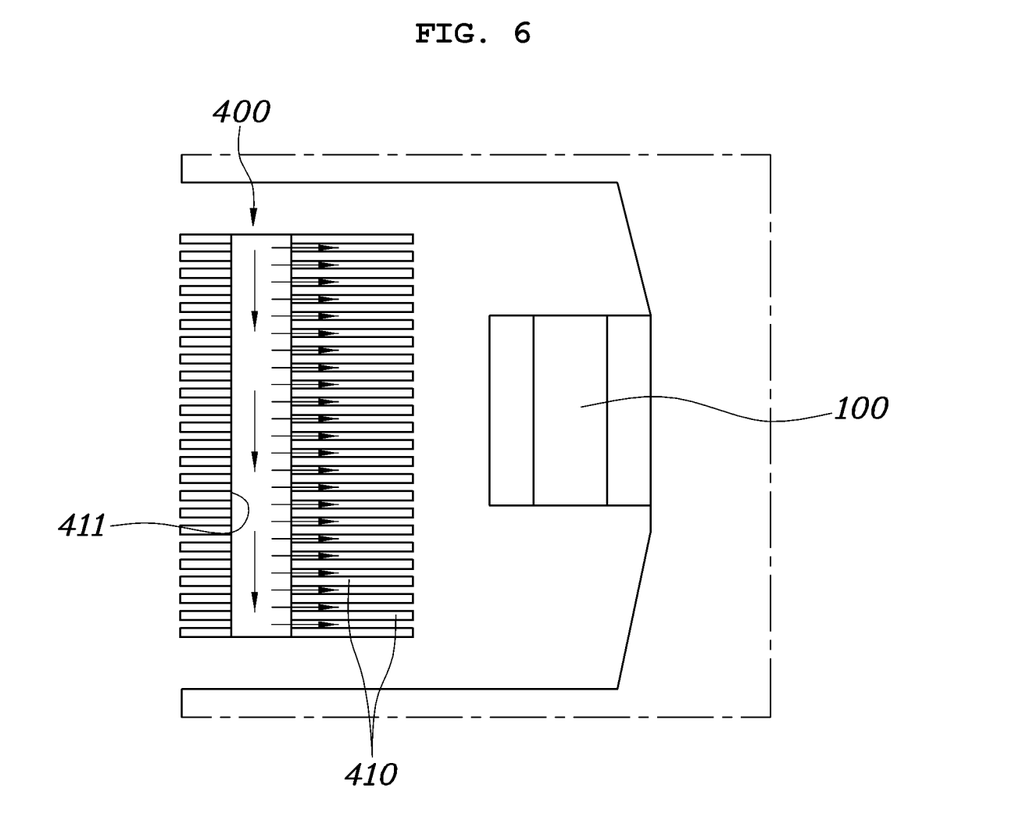
FIG. 6 is a view showing an air flow of the motor apparatus having a cooling structure shown in FIG. 1.

FIG. 1 is a view showing a motor apparatus having a cooling structure according to one form of the present disclosure; FIG. 2 is a cross-sectional view of the motor apparatus having a cooling structure shown in FIG. 1; FIG. 3 is an exploded perspective view of the motor apparatus having a cooling structure shown in FIG. 1; FIG. 4 is a view showing a first part of the motor apparatus having a cooling structure shown in FIG. 1; FIG. 5 is a view showing a second part and turbine portion of the motor apparatus having a cooling structure shown in FIG. 1; and FIG. 6 is a view showing an air flow of the motor apparatus having a cooling structure shown in FIG. 1.

As shown in FIGS. 1 to 3, the motor apparatus having a cooling structure includes: a first part 200 having a first flow path 210 and a motor 100 installed thereon; a second part 300 having a second flow path 310, being rotatably mounted on the first part 200, and connected to the motor 100 to be rotated when the motor 100 is operated; and a turbine portion 400 coupled to the inside of the second part 300 to be rotated together with the second part 300, and having a plurality of disks 410 each having an opening hole 411 and stacked on each other in a vertical direction of the motor apparatus to form a spaced space (A) between the respective disks 410, the opening hole 411 and the spaced space (A) being in communication with each other.

The first part 200 and the second part 300 may be coupled to each other to form one housing, the second part 300 being rotatably mounted on the first part 200. Here, the first part 200 may be referred to as a lower portion of the housing, and the second part 300 may be referred to as its upper portion, and air may be introduced into the housing or discharged to the outside through the first flow path 210 formed in the first part 200 or the second flow path 310 formed in the second part 300.

Meanwhile, the motor 100 may be installed on the first part 200, and the second part 300 may be mounted on the first part 200 to be connected to the motor 100, and may thus be rotated when the motor 100 is rotated. Here, a shaft 330 may vertically pass through and be coupled to a central portion of the second part 300 to be rotated together with the second part 300. Accordingly, a rotation power may be transmitted to another portion by rotation of the shaft 330. For example, the propeller may be installed on the shaft 330 and rotated by the shaft 330 rotated together with the second part 300 when the motor 100 is operated.

In particular, the cooling structure of the present disclosure includes the turbine portion 400 which is coupled to the inside of the second part 300 and rotated together with the second part 300, for cooling the motor 100. The turbine portion 400 may include the plurality of disks 410 each having the opening hole 411 and stacked on each other in the vertical direction to form the spaced space (A) between the respective disks 410, the opening hole 411 and the spaced space (A) being in communication with each other.

Accordingly, when the turbine portion 400 is rotated together with the second part 300, air may be drawn through the first flow path 210 or the second flow path 310 and introduced into the opening hole 411 of each of the disks 410, and the air introduced into the opening hole 411 may then be discharged into the spaced space (A) between the respective disks 410 and moved to the motor 100 to cool the motor 100. That is, the turbine portion 400 may have the plurality of disks 410, and each of the disks 410 may have the opening hole 411. Accordingly, when the turbine portion 400 is rotated at high speed, the air drawn through the first flow path 210 or the second flow path 310 by pressure difference may be introduced into the opening hole 411 of each of the disks 410, and may be discharged to the spaced space (A) between the respective disks 410 as the each disk 410 is rotated. As described above, the air discharged between the plurality of disks 410 forming the turbine portion 400 may be moved toward the motor 100 to cool the motor 100, and then discharged through the second flow path 310 or the first flow path 210.

As such, the air may be circulated in the first and second parts 200 and 300, and the air flow may be guided by the rotation of the turbine portion 400, thereby cooling the motor 100.

When explaining the above-described present disclosure in detail, as shown in FIG. 4, the first part 200 may have a motor seating portion 220 extending in the vertical direction and seating the motor 100 thereon and a turbine seating portion 230 extending from the inside of the motor seating portion 220 in the vertical direction and seating the turbine portion 400 thereon.

In the present disclosure, as the motor 100 generating rotational power and the turbine portion 400 performing rotational movement are each formed in a circular shape, the motor seating portion 220 and the turbine seating portion 230 may each be formed in a cylindrical shape extending in the vertical direction. In addition, the motor 100 may be larger than the turbine portion 400. Accordingly, the turbine seating portion 230 on which the turbine portion 400 is seated may be positioned inside the first part 200, and the motor seating portion 220 on which the motor 100 is seated may be positioned outside the turbine seating portion 230. Therefore, the motor 100 positioned on the first part 200 may be coupled and fixed to the motor seating portion 220, and the turbine portion 400 may be coupled and fixed to the turbine seating portion 230, thereby performing their stable rotations.

Here, a plurality of through-holes 221 may be formed in a circumferential surface of the motor seating portion 220, and air discharged from the turbine portion 400 may thus pass through the through-holes 221 and be moved to the motor 100. As shown in FIG. 4, the plurality of through-holes 221 may be formed in the motor seating portion 220. Accordingly, air discharged from the inside of the motor seating portion 220 by the rotation of the turbine portion 400 may be transferred to the motor 100 through the through-holes 221 of the motor seating portion 220. The through-holes 221 may each be formed in a shape of a slit or plurality of holes extending in a circumferential direction.

Meanwhile, the motor 100 may include a stator portion 110 mounted on the motor seating portion 220, a coil portion 120 positioned along a circumference of the stator portion 110, and a rotor portion 130 surrounding the coil portion 120 and coupled to the inner surface of the second part 300. That is, the motor 100 according to the present disclosure is an exterior rotor type, the stator portion 110 and the coil portion 120 may be mounted on and fixed to the motor seating portion 220, and the rotor portion 130 may be rotated based on whether or not electricity is applied to the stator portion 110. In particular, the rotor portion 130 may be coupled to the second part 300, and the turbine portion 400 and the shaft 330 may thus be rotated together with the second part 300 when the rotor portion 130 is rotated.

Meanwhile, as shown in FIG. 5, the second part 300 may have an installation portion 320 extending in the vertical direction, and each of the disks 410 forming the turbine portion 400 may have a coupling hole 412 into which the installation portion 320 is inserted, each of the disks 410 being coupled to the installation portion 320 through the coupling hole 412. That is, the installation portion 320 of the second part 300 may be inserted into the coupling hole 412 of each of the disks 410, and thereby the turbine portion 400 may be fitted to the second part 300. In addition, the second part 300 and each of the disks 410 may be bonded to each other to secure a rigid coupling therebetween. Here, the plurality of disks 410 forming the turbine portion 400 may be integrally coupled to each other through a bolt (B) passing through the plurality of disks 410 in the vertical direction. Accordingly, the turbine portion 400 may be coupled to the installation portion 320 of the second part 300, and the respective disks 410 may maintain a predetermined interval therebetween.

Meanwhile, a plurality of first flow paths 210 may be formed on the circumferential surface or lower surface of the first part 200, and a plurality of second flow paths 310 may be formed on the circumferential surface or upper surface of the second part 300. The drawings show that the first flow path 210 is formed on the circumferential surface of the first part 200 and the second flow path 310 is formed on the circumferential surface of the second part 300. However, the first flow path 210 may be formed on the lower surface of the first part 200, and the second flow path 310 may be formed on the upper surface of the second part 300. In addition, the air flow may be smoother by forming a flow path extending toward the opening hole 411 of each of the disks 410 in the flow path through which air is introduced among the first flow path 210 and the second flow path 310.

Meanwhile, a vertical length of the turbine portion 400 may be longer than a vertical length of the motor 100 as the disks 410 are stacked on each other. As such, the vertical length of the turbine portion 400 may be longer than that of the motor 100, and the air discharged from the turbine portion 400 may thus cool the motor 100 more efficiently.

Meanwhile, a motor apparatus having a cooling structure for an air mobility according to the present disclosure includes: a first part 200 having a first flow path 210 and a motor 100 installed thereon; a second part 300 having a second flow path 310, being rotatably mounted on the first part 200, connected to the motor 100 to be rotated when the motor 100 is operated, and rotated together with a shaft 330 which is coupled to its central portion to rotate a propeller; and a turbine portion 400 coupled to the inside of the second part 300 to be rotated together with the second part 300, and having a plurality of disks 410 each having an opening hole 411 and stacked on each other in a vertical direction to form a spaced space (A) between the respective disks 410, the opening hole 411 and the spaced space (A) being in communication with each other, wherein when the turbine portion 400 is rotated together with the second part 300, air may be drawn through the first flow path 210 or the second flow path 310 and introduced into the opening hole 411 of each of the disks 410, and the air introduced into the opening hole 411 may then be discharged into the spaced space (A) between the respective disks 410 to cool the motor 100.

As such, the present disclosure may be applied to the motor apparatus for rotating the propeller, which is the main component for flying the air mobility.

That is, in the present disclosure, as the motor 100 is driven for flying the air mobility, when the second part 300 is rotated, the turbine portion 400 may be rotated together with the second part 300, and as the respective disks 410 forming the turbine portion 400 are rotated, air drawn through the first flow path 210 or the second flow path 310 may be introduced into the opening hole 411 of each of the disks 410. The air introduced into the opening hole 411 of each of the disks 410 may then be discharged to the spaced space (A) between the respective disks 410 as the respective disks 410 are rotated, and moved toward the motor 100 to cool the motor 100.

As described above, when the motor 100 is driven for flying the air mobility, the turbine portion 400 may induce the fluid flow into the motor 100 to cool the motor 100, thereby preventing an overheating of the motor to secure an output performance of the motor, and extending a service life of the motor.

The motor apparatus having the cooling structure formed as described above may effectively cool the motor by inducing the fluid flow into the motor, thereby preventing overheating of the motor to secure the output performance of the motor, and extending the service life of the motor. Meanwhile, the motor apparatus having the cooling structure can be also applied to a motor apparatus including an interior rotor type motor, and may be applied to aviation vehicles that are currently actively growing, such as a drone, a light aircraft, an urban air mobility (UAM), an unmanned aircraft system (UAS), etc.

Although the present disclosure has been shown and described with respect to the exemplary forms, it is apparent to those having ordinary skill in the art that the present disclosure may be variously modified and altered without departing from the spirit and scope of the present disclosure.

What is claimed is:
1. A motor apparatus having a motor cooling structure, the motor apparatus comprising:
a first part having a first flow path and a motor installed thereon;

a second part having a second flow path, and configured to be rotatably mounted on the first part and connected to the motor to be rotated when the motor is operated; and a turbine portion coupled to an inside of the second part and configured to rotate together with the second part, wherein:

the turbine portion includes a plurality of disks each having an opening hole, disks of the plurality of disks are stacked on one another in a vertical direction of the motor apparatus and form a space between the respective disks, the opening holes and the spaces are in communication with each other, when the turbine portion is rotated together with the second part, air is drawn through the first flow path or the second flow path and introduced into the opening hole of each of the disks, the air introduced into the opening holes is then discharged into the spaces formed between the respective disks to cool the motor, the second part has an installation portion extending in the vertical direction, and each of the disks forming the turbine portion has a coupling hole into which the installation portion is inserted, each of the disks being coupled to the installation portion through the coupling hole, and the turbine portion is disposed between the motor of the first part and the installation portion of the second part, and the motor is disposed to directly face the air discharged through the opening hole of each of the disks and the spaces.

2. The motor apparatus of claim 1, wherein:

the first part includes a motor seating portion extending in the vertical direction and the motor seats on the motor seating portion, and the first part further includes a turbine seating portion extending from the inside of the motor seating portion in the vertical direction and the turbine portion seats on the turbine seating portion via the second part.

3. The motor apparatus of claim 2, wherein the motor includes: a stator portion mounted on the motor seating portion, a coil portion positioned along a circumference of the stator portion, and a rotor portion surrounding the coil portion and coupled to an inner surface of the second part.

4. The motor apparatus of claim 2, wherein a plurality of through-holes are formed in a circumferential surface of the motor seating portion, and air discharged from the turbine portion passes through the through-holes and is moved to the motor.

5. The motor apparatus of claim 1, wherein a shaft vertically passes through and is coupled to a central portion of the second part to be rotated together with the second part.

6. The motor apparatus of claim 1, wherein a plurality of first flow paths are formed on a circumferential surface or a lower surface of the first part, and a plurality of second flow paths are formed on the circumferential surface or upper surface of the second part.

7. The motor apparatus of claim 1, wherein a vertical length of the turbine portion is longer than a vertical length of the motor.

8. A motor apparatus having a motor cooling structure for an air mobility vehicle, the motor apparatus comprising:

a first part having a first flow path and a motor installed thereon;

a second part having a second flow path, and configured to be rotatably mounted on the first part and connected to the motor to be rotated when the motor is operated, the second part further configured to be coupled to a shaft to rotate a propeller; and a turbine portion coupled to an inside of the second part and configured to be rotated together with the second part, wherein:

the turbine portion includes a plurality of disks each having an opening hole and disks of the plurality of disks are stacked on each other in a vertical direction of the motor apparatus and form a space between the respective disks, the opening holes and the spaces are in communication with each other, when the turbine portion is rotated together with the second part, air is drawn through the first flow path or the second flow path and introduced into the opening hole of each of the disks, the air introduced into the opening holes is then discharged into the space formed between the respective disks to cool the motor, the second part has an installation portion extending in the vertical direction, and each of the disks forming the turbine portion has a coupling hole into which the installation portion is inserted, each of the disks being coupled to the installation portion through the coupling hole, and the turbine portion is disposed between the motor of the first part and the installation portion of the second part, and the motor is disposed to directly face the air discharged through the opening hole of each of the disks and the spaces.

* * * * *